US012382239B2

(12) United States Patent
Kaku

(10) Patent No.: US 12,382,239 B2
(45) Date of Patent: Aug. 5, 2025

(54) INFORMATION PROCESSING APPARATUS, OPERATING METHOD OF INFORMATION PROCESSING APPARATUS, AND NON-TRANSITORY COMPUTER READABLE MEDIUM

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 18/162,199

(22) Filed: Jan. 31, 2023

(65) Prior Publication Data

US 2023/0247383 A1 Aug. 3, 2023

(30) Foreign Application Priority Data

Feb. 2, 2022 (JP) ................................ 2022-015239

(51) Int. Cl.
*H04S 7/00* (2006.01)
*H04R 1/40* (2006.01)

(52) U.S. Cl.
CPC ........... *H04S 7/303* (2013.01); *H04S 2400/11* (2013.01)

(58) Field of Classification Search
None
See application file for complete search history.

(56) References Cited

U.S. PATENT DOCUMENTS 11,451,922 B1 * 9/2022 Moses .................... H04R 5/033
2012/0121093 A1 * 5/2012 Araki ....................... H04R 3/14 381/17
2014/0300636 A1 * 10/2014 Miyazaya ............. H04R 5/033 345/633
2015/0296086 A1 * 10/2015 Eckert ....................... H04S 5/00 381/17
2018/0192227 A1 * 7/2018 Woelfl ..................... H04R 3/02
2019/0149937 A1 * 5/2019 Norris .................... H04N 23/60 700/94
2021/0397249 A1 * 12/2021 Kriminger .............. G06F 3/011
2021/0397250 A1 * 12/2021 Akgul .................. G06F 3/0346
2023/0164304 A1 5/2023 Sato
(Continued)

FOREIGN PATENT DOCUMENTS

EP 4270166 A2 * 11/2023 ............ A63F 13/00
JP 2004-297766 A 10/2004
JP 2007-124140 A 5/2007
(Continued)

OTHER PUBLICATIONS

"Google's Project Starline is a 'magic window' for 3D telepresence", Online, Retrieved on Dec. 13, 2021, 3 page(s), Internet: URL: https://engadget.com/google-project-starline-191228699.html.

*Primary Examiner* — Qin Zhu
(74) *Attorney, Agent, or Firm* — Sughrue Mion, PLLC

(57) ABSTRACT

A terminal apparatus includes a display and a controller. The controller is configured to form a virtual sound source outputting sound emitted by an object, at an intersection between a screen of the display and a straight line connecting a position, in real space, of a mouth of the object disposed in virtual space viewed from a virtual camera and a position of a head of a user facing the display.

12 Claims, 6 Drawing Sheets

(56) References Cited

U.S. PATENT DOCUMENTS

2023/0328470 A1 * 10/2023 Lyren ...................... H02M 1/08
379/310

FOREIGN PATENT DOCUMENTS

JP 2008-005122 A 1/2008
JP 2011-166316 A 8/2011
WO 2021/220494 A1 11/2021
WO WO-2021262507 A1 * 12/2021 .............. G06F 3/011

* cited by examiner

INFORMATION PROCESSING APPARATUS, OPERATING METHOD OF INFORMATION PROCESSING APPARATUS, AND NON-TRANSITORY COMPUTER READABLE MEDIUM

CROSS-REFERENCE TO RELATED APPLICATION

This application claims priority to Japanese Patent Application No. 2022-015239 filed on Feb. 2, 2022, the entire contents of which are incorporated herein by reference.

TECHNICAL FIELD

The present disclosure relates to a terminal apparatus, an operating method of a terminal apparatus, and a program.

BACKGROUND

Technology for having a conversation between multiple users using virtual space is known. For example, Non-patent Literature (NPL) 1 discloses a virtual face-to-face system using a light field display.

CITATION LIST

Non-Patent Literature

NPL 1: "Google's Project Starline is a 'magic window' for 3D telepresence", [online], [retrieved on Dec. 13, 2021], Internet <URL: https://engadget.com/google-project-starline-191228699.html>

SUMMARY

In the technology, sound is output to users in fixed directions. Therefore, depending on the position of an interlocutor seen through a display, a user may feel strangeness with respect to a direction from which sound such as voice emitted by the interlocutor is heard.

It would be helpful to provide technology for reducing a feeling of strangeness felt by a user with respect to a direction from which sound emitted by an interlocutor is heard.

A terminal apparatus according to an embodiment of the present disclosure includes:

a display; and a controller configured to form a virtual sound source outputting sound emitted by an object, at an intersection between a screen of the display and a straight line connecting a position, in real space, of a mouth of the object disposed in virtual space viewed from a virtual camera and a position of a head of a user facing the display.

An operating method of a terminal apparatus according to an embodiment of the present disclosure includes forming a virtual sound source outputting sound emitted by an object, at an intersection between a screen of a display and a straight line connecting a position, in real space, of a mouth of the object disposed in virtual space viewed from a virtual camera and a position of a head of a user facing the display.

A program according to an embodiment of the present disclosure is configured to cause a computer to execute operations, the operations including forming a virtual sound source outputting sound emitted by an object, at an intersection between a screen of a display and a straight line connecting a position, in real space, of a mouth of the object disposed in virtual space viewed from a virtual camera and a position of a head of a user facing the display.

According to an embodiment of the present disclosure, it is possible reduce a feeling of strangeness felt by a user with respect to a direction from which sound emitted by an interlocutor is heard.

DETAILED DESCRIPTION

An embodiment of the present disclosure will be described below, with reference to the drawings.

Figure 1:
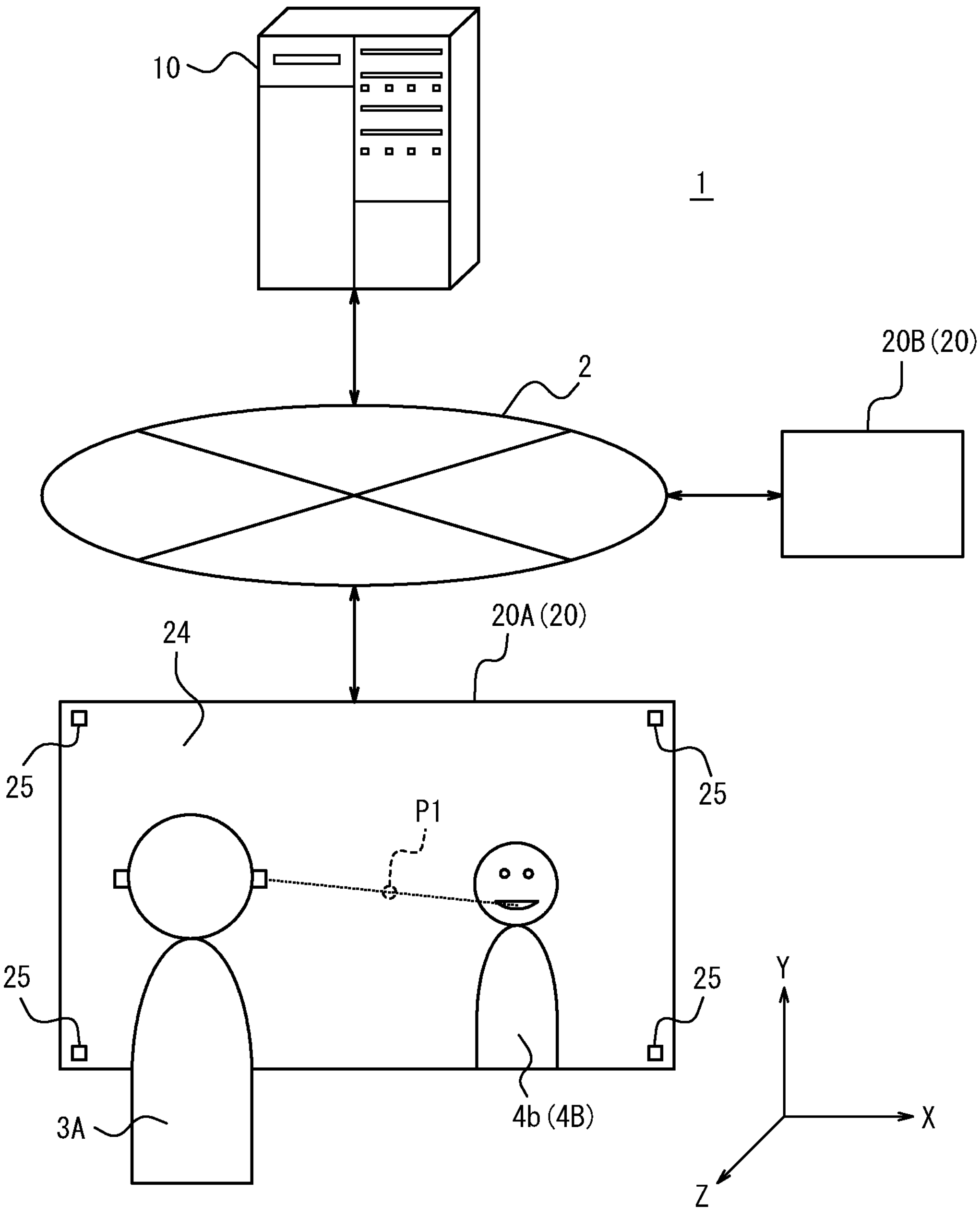
FIG. 1 is a diagram illustrating a schematic configuration of a provisioning system according to an embodiment of the present disclosure.

As illustrated in FIG. 1, a provisioning system 1 includes at least one server apparatus 10, a terminal apparatus 20A, and a terminal apparatus 20B.

Hereinafter, the terminal apparatuses 20A and 20B are also collectively referred to as "terminal apparatuses 20" unless particularly distinguished. The provisioning system 1 includes two terminal apparatuses 20. However, the provisioning system 1 may include three or more terminal apparatuses 20.

The server apparatus 10 can communicate with the terminal apparatuses 20 via a network 2. The network 2 may be any network including a mobile communication network, the Internet, or the like.

The provisioning system 1 is a system for providing virtual events. The virtual events are events provided using virtual space. The virtual events are events in which users can participate as participants using the terminal apparatuses 20. In the virtual events, a plurality of participants can communicate by speech or other means. In the virtual events, each participant is represented by a three-dimensional model that represents himself/herself.

The server apparatus 10 is, for example, a server computer that belongs to a cloud computing system or another computing system and functions as a server that implements various functions. The server apparatus 10 may be constituted of two or more server computers that are communicably connected to each other and operate in cooperation.

The server apparatus 10 performs processing required for provision of a virtual event. For example, the server apparatus 10 transmits information required for provision of the virtual event to the terminal apparatuses 20 via the network 2. The server apparatus 10 also intermediates transmission and reception of information between the terminal apparatuses 20A and 20B.

Each of the terminal apparatuses 20 is, for example, a terminal apparatus such as a desktop personal computer (PC), a tablet PC, a notebook PC, or a smartphone.

The terminal apparatus 20A is used by a user 3A. The terminal apparatus 20B is used by a user 3B. The user 3A participates in the virtual event using the terminal apparatus 20A. The user 3B participates in the virtual event using the terminal apparatus 20B.

The terminal apparatuses 20 each have a display 24 and four speakers 25. However, the number of speakers 25 included in each terminal apparatus is not limited to four. Each of the terminal apparatuses 20 only needs to have two or more speakers 25.

The display 24 is, for example, a liquid crystal display (LCD), an organic electro luminescent (EL) display, or the like. The display 24 is, for example, rectangular in shape.

The four speakers 25 are arranged at four corners of the rectangular display 24, respectively. The speakers 25 may be arranged in a frame around the display 24 or embedded in the display 24. However, the speakers 25 may be provided at any parts on the display 24. The speakers 25 may be directional speakers. The directional speakers are capable of outputting a beam of sound waves generated in a beam shape by imparting directionality to the sound waves.

An outline of operations of the terminal apparatuses 20 will be described, using the terminal apparatus 20A as an example. The terminal apparatus 20A controls the display 24 to display a two-dimensional image in which an object 4B is drawn. The object 4B is a three-dimensional model representing the user 3B. A partial image 4*b* displayed on the display 24 is a partial image of the object 4B drawn in the two-dimensional image. The terminal apparatus 20A forms a virtual sound source, which outputs sound emitted by the object 4B, at an intersection P1. The virtual sound source is an imaginary sound source. The virtual sound source is formed, for example, by adjusting the volume, directivity, or the like of the two or more speakers 25. Here, the intersection P1 is an intersection between a screen of the display 24 and a straight line connecting the position of a mouth of the object 4B in real space and the position of a head of the user 3A. By forming the virtual sound source at such an intersection P1, the sound emitted by the object 4B is output from the intersection P1 in a direction toward the head of user 3A. Therefore, the user 3A can feel as if voice of the user 3B is being output from the mouth of the object 4B. This configuration can reduce a feeling of strangeness felt by the user 3A with respect to a direction from which the sound emitted by the object 4B, being an interlocutor, is heard, as compared to a case in which a sound source for outputting the sound emitted by the object 4B is fixed.

Hereafter, assuming that a three-dimensional coordinate system in the real space is an XYZ coordinate system with respect to the display 24. However, any coordinate system may be used as the three-dimensional coordinate system in the real space. In the present embodiment, an X direction corresponds to a horizontal direction of the screen of the display 24. A Y direction corresponds to a vertical direction of the screen of the display 24. A Z direction corresponds to a facing direction in which the user 3A faces the display 24. The horizontal and vertical directions of the screen of the display 24 may be set as appropriate according to specifications of the display 24.

(Configuration of Server Apparatus)

Figure 2:
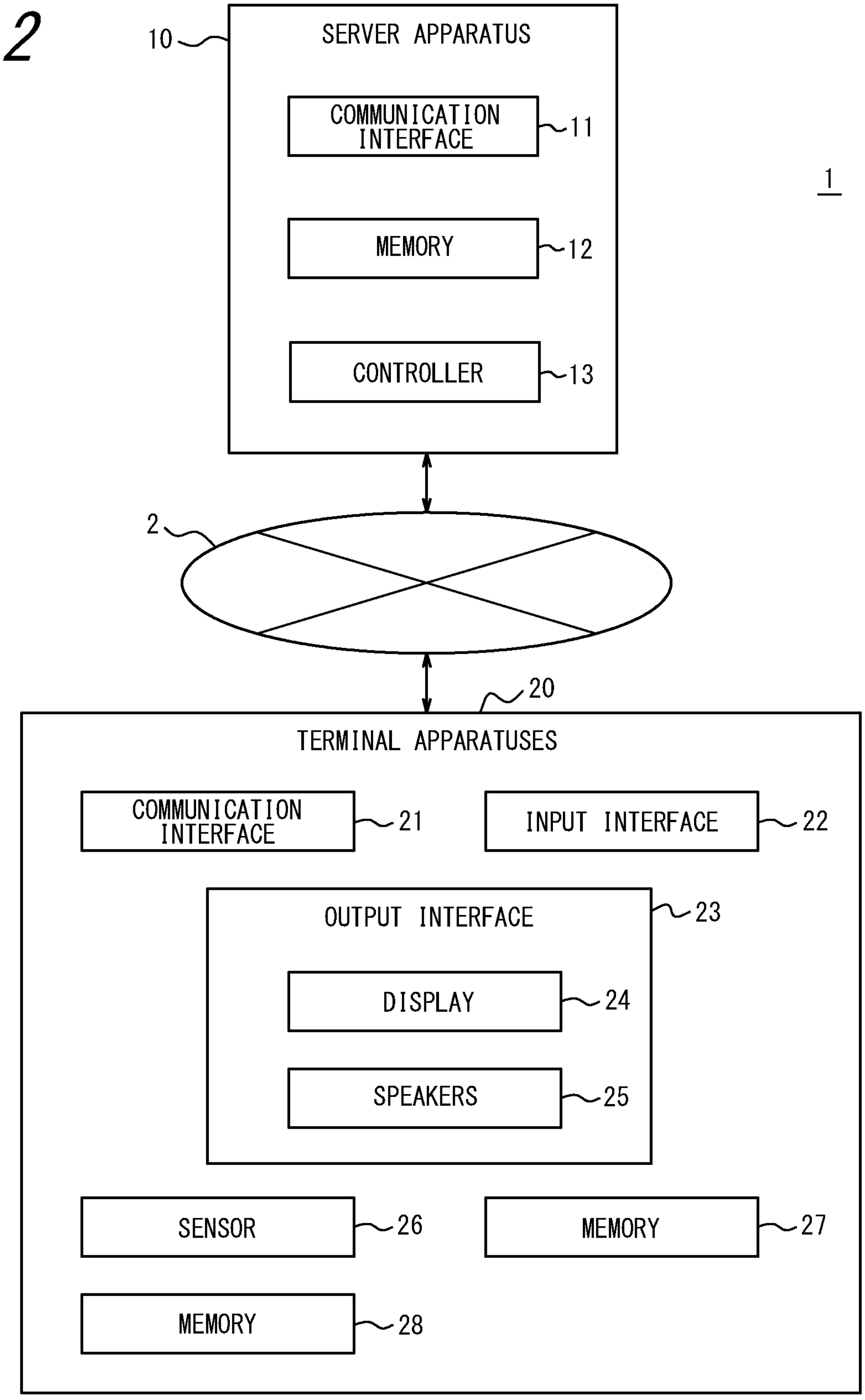
FIG. 2 is a block diagram of the provisioning system illustrated in FIG. 1.

As illustrated in FIG. 2, the server apparatus 10 includes a communication interface 11, a memory 12, and a controller 13.

The communication interface 11 is configured to include at least one communication module for connection to the network 2. The communication module is, for example, a communication module compliant with a standard such as a wired Local Area Network (LAN) standard or a wireless LAN standard. However, the communication module is not limited to this. The communication module may be compliant with any communication standard. The communication interface 11 is connectable to the network 2 via a wired LAN or a wireless LAN using the communication module.

The memory 12 is configured to include at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM), dynamic random access memory (DRAM), or the like. The ROM is, for example, electrically erasable programmable read only memory (EEPROM) or the like. The memory 12 may function as a main memory, an auxiliary memory, or a cache memory. The memory 12 stores data to be used for operations of the server apparatus 10 and data obtained by the operations of the server apparatus 10.

The controller 13 is configured to include at least one processor, at least one dedicated circuit, or a combination thereof. The processor is, for example, a general purpose processor such as a Central Processing Unit (CPU) or a Graphics Processing Unit (GPU), or a dedicated processor that is dedicated to specific processing. The dedicated circuit is, for example, a Field-Programmable Gate Array (FPGA), an Application Specific Integrated Circuit (ASIC), or the like. The controller 13 executes processes related to operations of the server apparatus 10 while controlling components of the server apparatus 10.

The functions of the server apparatus 10 may be implemented by executing a processing program according to the present embodiment by a processor corresponding to the controller 13. That is, the functions of the server apparatus 10 are realized by software. The processing program causes a computer to execute the operations of the server apparatus 10, thereby causing the computer to function as the server apparatus 10. That is, the computer executes the operations of the server apparatus 10 in accordance with the processing program to thereby function as the server apparatus 10.

Some or all of the functions of the server apparatus 10 may be implemented by a dedicated circuit corresponding to the controller 13. That is, some or all of the functions of the server apparatus 10 may be realized by hardware.

(Configuration of Terminal Apparatus)

As illustrated in FIG. 2, the terminal apparatus 20 includes a communication interface 21, an input interface 22, an output interface 23, a sensor 26, a memory 27, and a controller 28.

The communication interface 21 is configured to include at least one communication module for connection to the network 2. For example, the communication module is, for example, a communication module compliant with a standard such as a wired LAN standard or a wireless LAN standard, or a mobile communication standard such as the Long Term Evolution (LTE) standard, the 4th Generation (4G) standard, or the 5th Generation (5G) standard. However, the communication module is not limited to this. The communication module may be compliant with any communication standard.

The input interface 22 is capable of accepting an input from a user. The input interface 22 is configured to include at least one interface for input that is capable of accepting the input from the user. The interface for input is, for example, a physical key, a capacitive key, a pointing device, a touch screen integrally provided with the display 24, a microphone, or the like. However, the interface for input is not limited to this.

The output interface 23 can output data. The output interface 23 is configured to include at least one interface for output that is capable of outputting the data. The interface for output includes the display 24 and the speakers 25 described above. However, the output interface 23 may include any additional interface for output, other than the display 24 and the speakers 25.

The sensor 26 includes a camera capable of capturing an image of a subject and generating the captured image, and a distance measuring sensor capable of measuring a distance to the subject. The camera is positioned to allow imaging of a user facing the display 24, as a subject. The camera captures continuous images of the subject at a frame rate of, for example, 15 to 30 [fps]. The distance measuring sensor is positioned to allow measurement of a distance from the display 24 to the subject. The distance measuring sensor produces a distance image. The distance image is an image in which a pixel value of each pixel corresponds to a distance. The distance measuring sensor includes, for example, Time of Flight (ToF) cameras, Light Detection And Ranging (LiDAR), stereo cameras, and the like.

The memory 27 is configured to include at least one semiconductor memory, at least one magnetic memory, at least one optical memory, or a combination of at least two of these. The semiconductor memory is, for example, RAM, ROM, or the like. The RAM is, for example, SRAM, DRAM, or the like. The ROM is, for example, EEPROM or the like. The memory 27 may function as a main memory, an auxiliary memory, or a cache memory. The memory 27 stores data to be used for the operations of the terminal apparatus 20 and data obtained by the operations of the terminal apparatus 20. The memory 27 stores, for example, position information on each pixel of the screen of the display 24 in the XYZ coordinate system.

The controller 28 is configured to include at least one processor, at least one dedicated circuit, or a combination thereof. The processor is, for example, a general purpose processor such as a CPU or a GPU, or a dedicated processor that is dedicated to a specific process. The dedicated circuit is, for example, an FPGA, an ASIC, or the like. The controller 28 executes processes related to operations of the terminal apparatus 20 while controlling components of the terminal apparatus 20.

The functions of the terminal apparatus 20 are realized by execution of a terminal program according to the present embodiment by a processor corresponding to the controller 28. That is, the functions of the terminal apparatus 20 are realized by software. The terminal program causes a computer to execute the operations of the terminal apparatus 20, thereby causing the computer to function as the terminal apparatus 20. That is, the computer executes the operations of the terminal apparatus 20 in accordance with the terminal program to thereby function as the terminal apparatus 20.

Some or all of the functions of the terminal apparatus 20 may be implemented by a dedicated circuit corresponding to the controller 28. That is, some or all of the functions of the terminal apparatus 20 may be realized by hardware.

(Operations of Provisioning System)

Figure 3:
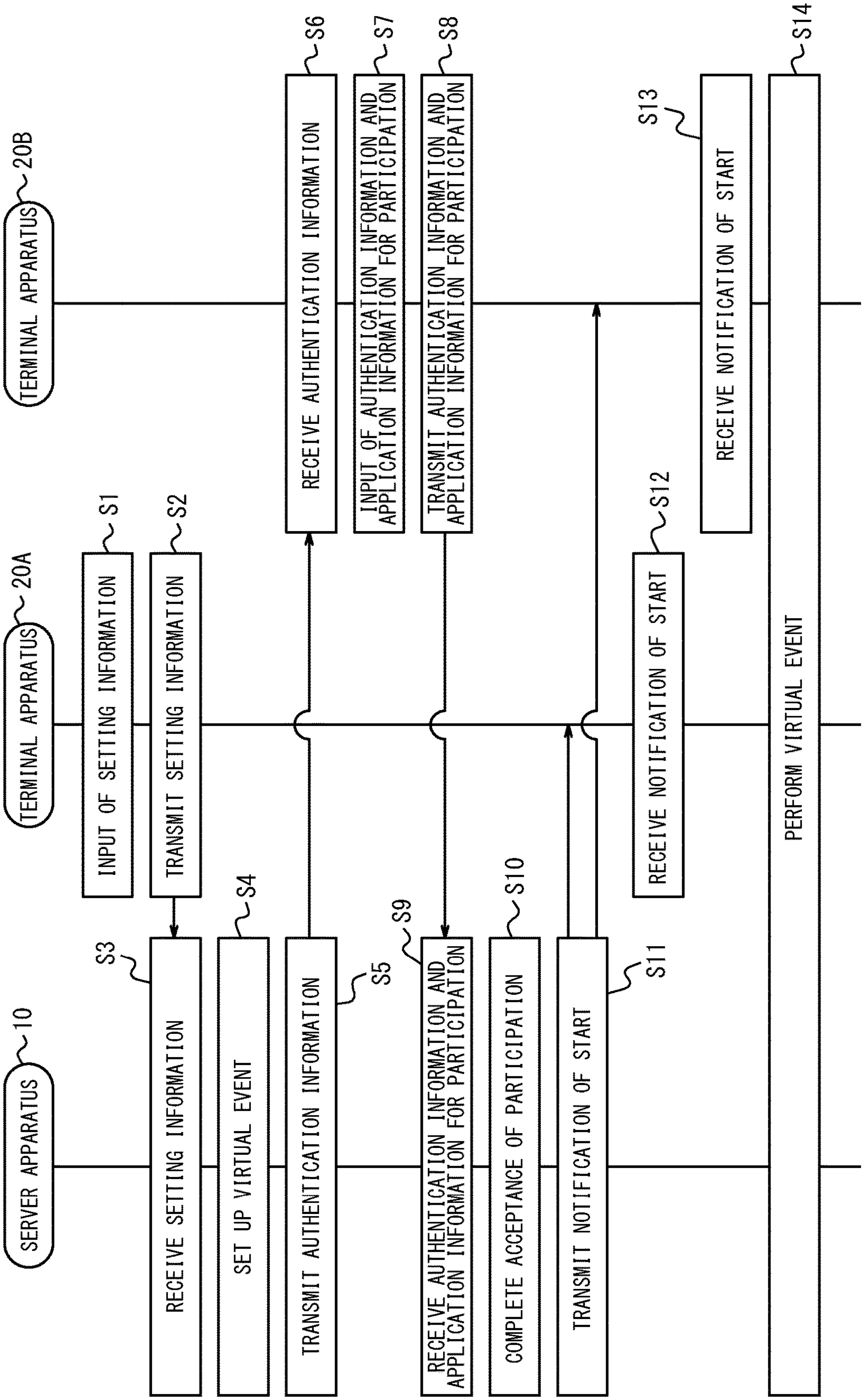
FIG. 3 is a sequence diagram illustrating an operation procedure of the provisioning system illustrated in FIG. 1.

FIG. 3 is a sequence diagram illustrating an operation procedure of the provisioning system 1 illustrated in FIG. 1. Hereinafter, assuming that the user 3A sets up a virtual event as an administrator of the virtual event. It is also assumed that the user 3A and the user 3B participate in the virtual event as participants.

In the processing of step S1, in the terminal apparatus 20A, the controller 28 controls the input interface 22 to accept an input of setting information from the user 3A. The setting information is information for setting up a virtual event. The setting information includes, for example, a schedule of the virtual event, a discussion topic, a participant list, and the like. The participant list includes names and e-mail addresses of participants. Here, the participant list includes the name and e-mail address of the user 3B, being a participant. For example, the controller 28 controls the communication interface 21 to access a site provided by the server apparatus 10 for setting up virtual events, and to acquire data for an input screen for entering the setting information. The controller 28 controls the display 24 to display the input screen to present the input screen to the user 3A. The user 3A sees the input screen and enters the setting information from the input interface 22.

In the processing of step S2, in the terminal apparatus 20A, the controller 28 controls the communication interface 21 to transmit the setting information accepted by the input interface 22 to the server apparatus 10 via the network 2.

In the processing of step S3, in the server apparatus 10, the controller 13 controls the communication interface 11 to receive the setting information from the terminal apparatus 20A via the network 2.

In the processing of step S4, in the server apparatus 10, the controller 13 sets up a virtual event based on the setting information received in the processing of step S3. For example, the controller 13 generates authentication information. The authentication information is information for authenticating the user 3B who is supposed to participate in the virtual event using the terminal apparatus 20B. The authentication information includes a participant ID, a passcode, and the like. The participant ID is identification information used by the user 3B to participate in the virtual event as a participant.

In the processing of step S5, in the server apparatus 10, the controller 13 controls the communication interface 11 to transmit the generated authentication information to the terminal apparatus 20B via the network 2. The controller 13 transmits the authentication information to the terminal apparatus 20B by attaching the authentication information to an e-mail.

In the processing of step S6, in the terminal apparatus 20B, the controller 28 controls the communication interface 21 to receive the authentication information from the server apparatus 10 via the network 2. The controller 28 receives the authentication information attached to the e-mail.

In the processing of step S7, in the terminal apparatus 20B, the controller 28 controls the input interface 22 to accept an input of authentication information and application information for participation from the user 3B. For example, the controller 28 controls the communication interface 21 to access the site for setting up virtual events provided by the server apparatus 10, and to acquire data for an input screen for entering the authentication information and the application information for participation. The controller 28 controls the display 24 to display the input screen to present the input screen to the user 3B. The user 3B sees the input screen and enters, from the input interface 22, the authentication information attached to the e-mail and the application information for participation.

In the processing of step S8, in the terminal apparatus 20B, the controller 28 controls the communication interface 21 to transmit the authentication information and the application information for participation accepted by the input interface 22 to the server apparatus 10 via the network 2.

In the processing of step S9, in the server apparatus 10, the controller 13 controls the communication interface 11 to receive the authentication information and the application information for participation from the terminal apparatus 20B via the network 2. The controller 13 completes an acceptance of participation of the user 3B by receiving the authentication information and the application information for participation (step S10).

In the processing of step S11, in the server apparatus 10, the controller 13 controls the communication interface 11 to transmit a notification of a start of the event to each of the terminal apparatuses 20A and 20B via the network 2.

In the processing of step S12, in the terminal apparatus 20A, the controller 28 controls the communication interface 21 to receive the notification of the start of the event from the server apparatus 10 via the network 2. Upon receiving the notification of the start of the event, the controller 28 starts collecting sound such as speech produced by the user 3A and starts imaging the user 3A.

In the processing of step S13, in the terminal apparatus 20B, the controller 28 controls the communication interface 21 to receive the notification of the start of the event from the server apparatus 10 via the network 2. Upon receiving the notification of the start of the event, the controller 28 starts collecting sound such as speech produced by the user 3B and starts imaging the user 3B.

In the processing of step S14, the terminal apparatus 20A and the terminal apparatus 20B perform the virtual event via the server apparatus 10.

(Operations of Terminal Apparatus)

Figure 4:
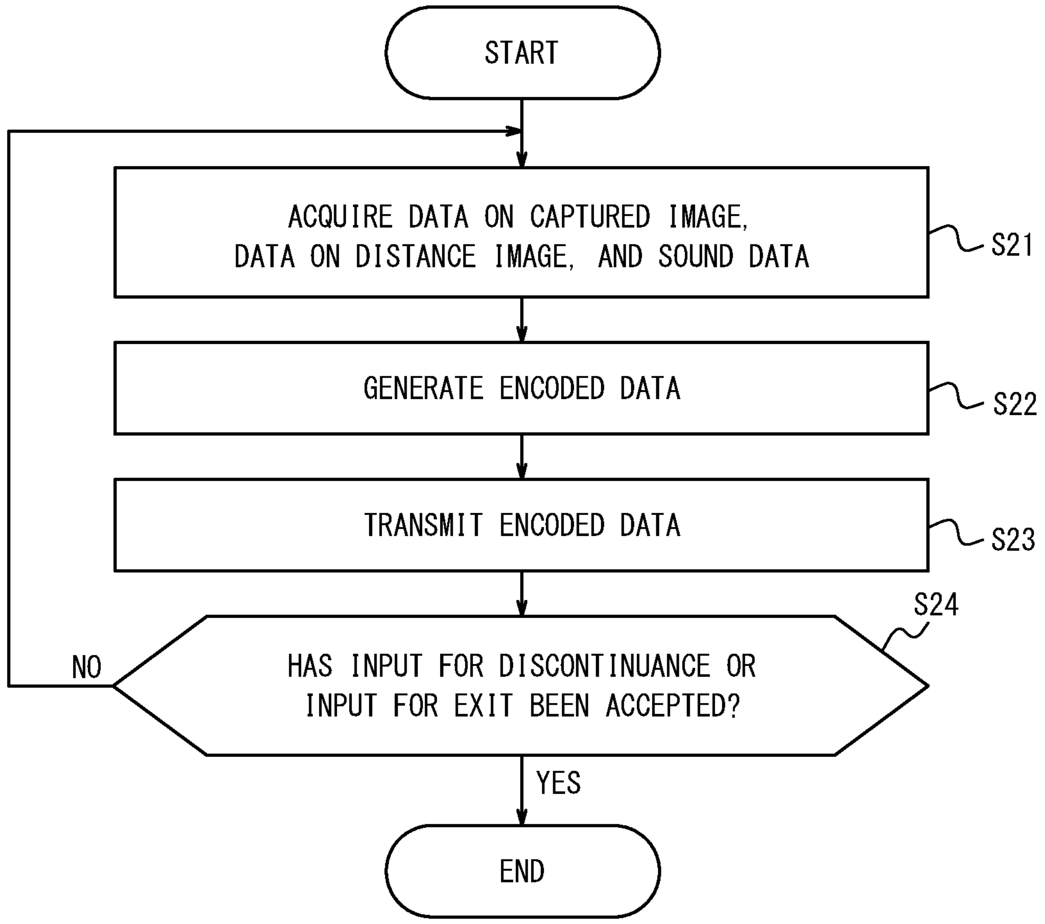
FIG. 4 is a flowchart illustrating an operation procedure of a terminal apparatus illustrated in FIG. 2.

FIG. 4 is a flowchart illustrating an operation procedure of the terminal apparatuses 20 illustrated in FIG. 2. The operation procedure illustrated in FIG. 4 is common to the terminal apparatuses 20A and 20B. The operation procedure illustrated in FIG. 4 is an example of an operating method of the terminal apparatuses 20 according to the present embodiment. The operation procedure illustrated in FIG. 4 is performed in step S14 illustrated in FIG. 3. In the following description, it is assumed that the terminal apparatus 20B performs the operation procedure illustrated in FIG. 4.

In step S21, the controller 28 controls the sensor 26 to acquire data on a captured image and a distance image of the user 3B. The controller 28 acquires sound data by collecting sound, such as speech produced by the user 3B, with a microphone of the input interface 22.

In step S22, the controller 28 generates encoded data by encoding the data on the captured image of the user 3B, the data on the distance image of the user 3B, and the sound data on the user 3B. In the terminal apparatus 20A, the encoded data is used for generating an object 4B, which is a three-dimensional model representing the user 3B as described above. In encoding, the controller 28 may perform any processing (for example, resolution change, cropping, or the like) on the captured image or the like.

In the processing of step S23, the controller 28 controls the communication interface 21 to transmit the encoded data, as packets, to the server apparatus 10 via the network 2. The encoded data is transmitted to the terminal apparatus 20A via the server apparatus 10.

In the processing of step S24, the controller 28 determines whether the input interface 22 has accepted an input to discontinue imaging and sound collection or an input to exit from the virtual event. When it is determined that the input to discontinue imaging and sound collection or the input to exit from the virtual event has been accepted (step S24: YES), the controller 28 ends the operation procedure illustrated in FIG. 4. When it is not determined that the input to discontinue imaging and sound collection or the input to exit from the virtual event has been accepted (step S24: NO), the controller 28 returns to the processing of step S21.

Figure 5:
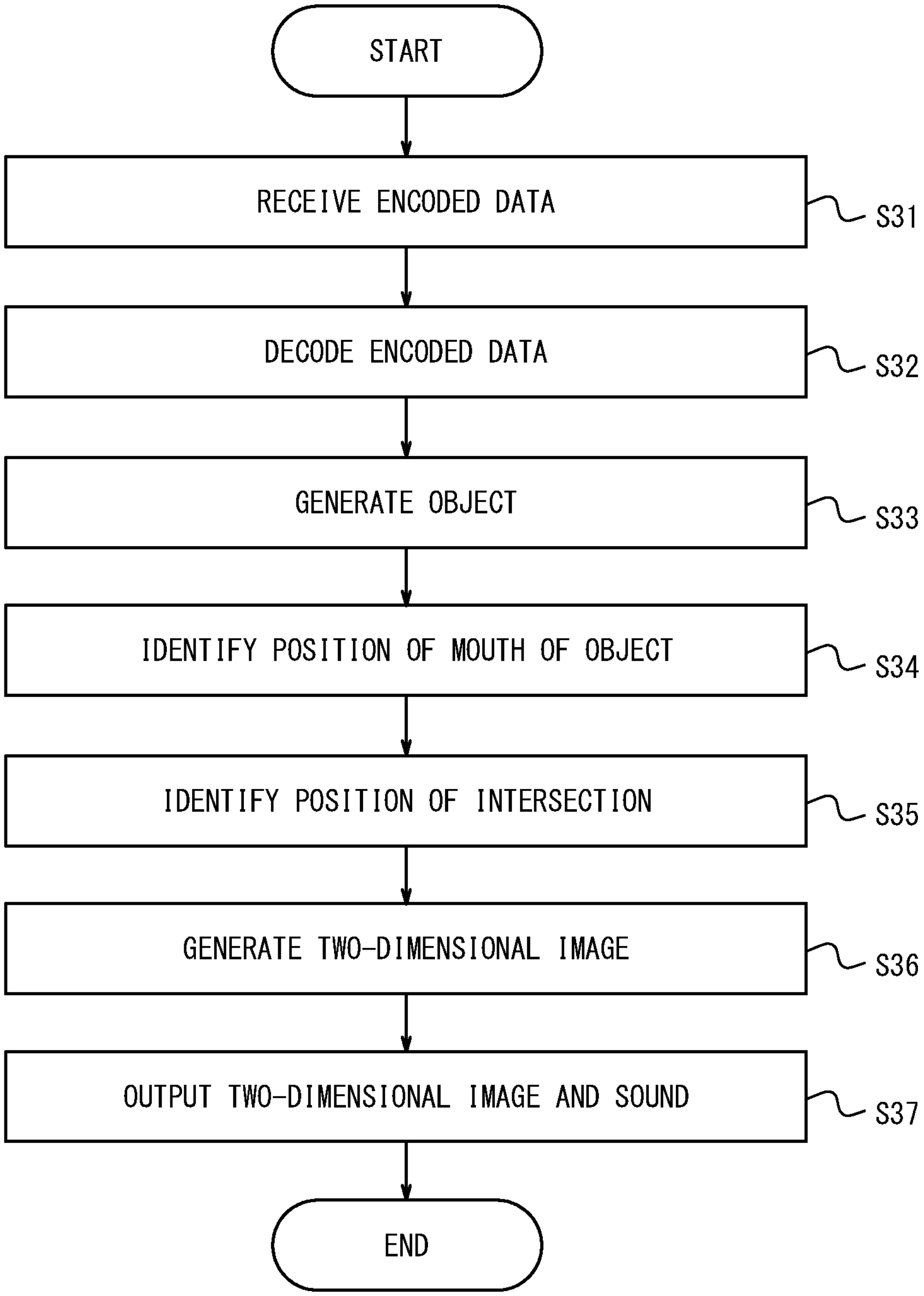
FIG. 5 is a flowchart illustrating an operation procedure of the terminal apparatus illustrated in FIG. 2.

FIG. 5 is a flowchart illustrating an operation procedure of the terminal apparatuses 20 illustrated in FIG. 2. The operation procedure illustrated in FIG. 5 is common to the terminal apparatuses 20A and 20B. The operation procedure illustrated in FIG. 5 is an example of an operating method of the terminal apparatuses 20 according to the present embodiment. The operation procedure illustrated in FIG. 5 is performed in step S14 illustrated in FIG. 3. In the following description, it is assumed that the terminal apparatus 20A performs the operation procedure illustrated in FIG. 5.

In the processing of step S31, the controller 28 controls the communication interface 21 to receive the encoded data from the terminal apparatus 20B via the network 2 and the server apparatus 10.

In the processing of step S32, the controller 28 decodes the received encoded data. By decoding the encoded data, the controller 28 acquires the data on the captured image of the user 3B, the data on the distance image of the user 3B, and the sound data on the user 3B.

In the processing of step S33, the controller 28 generates the object 4B using the data on the captured image and distance image of the user 3B. For example, the controller 28 generates a polygon model using the data on the distance image of the user 3B, and generates the object 4B by applying texture mapping, using the data on the captured image of the user 3B, to the polygon model. However, generation of objects, as three-dimensional models, is not limited to this. The controller 28 may employ any method to generate objects. The controller 28 disposes the generated object 4B and a virtual camera in virtual space. The controller 28 may adjust the position, orientation, and field of view of the virtual camera as appropriate, based on an operation input by the user 3A received by the input interface 22.

In the processing of step S34, the controller 28 identifies the position of a mouth of the object 4B disposed in the virtual space viewed from the virtual camera. The controller 28 may identify the position of the mouth of the object 4B by any method such as image analysis.

In the processing of step S35, the controller 28 identifies the position of an intersection P1 at which a virtual sound source is to be formed, as described above with reference to FIG. 1. As described above, the intersection P1 is an intersection between the screen of the display 24 and a straight line connecting the position of the mouth of the object 4B in real space and the position of a head of the user 3A.

In the processing of step S35, the controller 28 identifies, in the XYZ coordinate system, the position of the intersection P1 between the screen of the display 24 and the straight line connecting the position of the mouth of the object 4B and the position of the head of the user 3A. In other words, the position of the intersection P1 is identified as a position in the XYZ coordinate system. In this case, the controller 28 identifies the position of the mouth of the object 4B in the XYZ coordinate system from the position of the mouth of the object 4B in the virtual space, which is identified in the processing of step S34, by converting a coordinate system in the virtual space into the XYZ coordinate system. The controller 28 identifies the position of the head of the user 3A in the XYZ coordinate system, based on the data on the captured image and distance image of the user 3A acquired by the sensor 26. The controller 28 identifies the position of the intersection P1, based on the identified position of the mouth of the object 4B in the XYZ coordinate system, the identified position of the head of the user 3A in the XYZ coordinate system, and position information on each pixel of the screen of the display 24 in the XYZ coordinate system.

In the processing of step S36, the controller 28 generates, by rendering, a two-dimensional image of the virtual space in which the object 4B viewed from the virtual camera is disposed.

In the processing of step S37, the controller 28 controls the display 24 to display the two-dimensional image generated in step S36. The controller 28 forms a virtual sound source at the intersection P1 identified in the processing of step S35, by adjusting the volume, directivity, or the like of the two or more speakers 25 as appropriate. The controller 28 controls the virtual sound source to output sound of the user 3B, which is acquired in the processing of step S32, as sound emitted by the object 4B. After executing the processing of step S37, the controller 28 ends the operation procedure illustrated in FIG. 5. However, when the encoded data is transmitted from the terminal apparatus 20B to the terminal apparatus 20A, the controller 28 reperforms the operation procedure from the processing of step S31.

Thus, the virtual sound source that outputs the sound emitted by the object 4B is formed at the intersection P1 in the processing of steps S35 to S37. The sound emitted by the object 4B is output from the intersection P1 in a direction toward the head of the user 3A. Therefore, the user 3A can feel as if voice of the user 3B is being output from the mouth of the object 4B. This configuration can reduce a feeling of strangeness felt by the user 3A with respect to a direction from which the sound emitted by the object 4B, being an interlocutor, is heard, as compared to a case in which a sound source for outputting the sound emitted by the object 4B is fixed. Furthermore, the position of the intersection P1 is identified as a position in the XYZ coordinate system, so the feeling of strangeness felt by the user 3A can be further reduced.

Here, it is assumed that in the processing of step S35, the position of the intersection P1 is identified as a position in the XYZ coordinate system. However, the position of an intersection at which a virtual sound source is to be formed is not limited to the position of the intersection P1 in the XYZ coordinate system. The position of the intersection at which the virtual sound source is to be formed may be identified as a position in a two-dimensional coordinate system in the real space. Other examples of the intersection at which the virtual sound source is to be formed will be described with reference to FIGS. 6 and 7.

Figure 6:
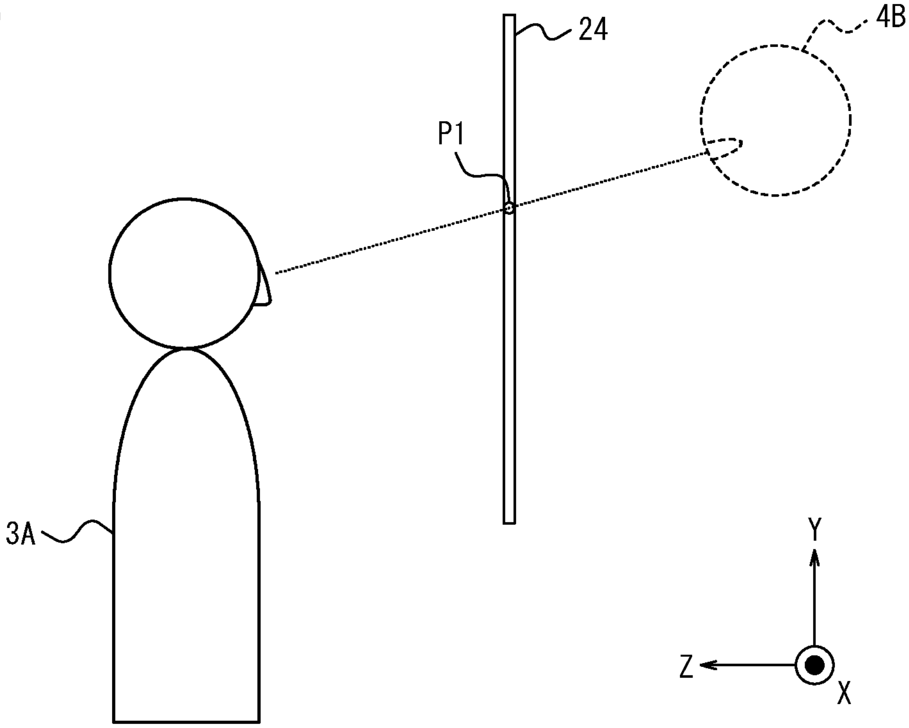
FIG. 6 is a drawing illustrating another example of an intersection at which a virtual sound source is formed.

FIG. 6 is a drawing illustrating another example of the intersection at which the virtual sound source is to be formed. In FIG. 6, the position of the head of the object 4B disposed in the virtual space is illustrated with a dashed line in the real space.

In FIG. 6, the position of the intersection P1 at which the virtual sound source is to be formed is identified as a position in a YZ coordinate system. The YZ coordinate system is a two-dimensional coordinate system in the real space that includes the Y direction, being the vertical direction of the display 24, and the Z direction, being the facing direction in which the user 3A faces the display 24.

The controller 28 identifies, in the YZ coordinate system, the position of the intersection P1 between the screen of the display 24 and a straight line connecting the position of the mouth of the object 4B and the position of the head of the user 3A. The controller 28 forms the virtual sound source, which outputs the sound emitted by the object 4B, at the intersection P1.

By identifying the position of the intersection P1 as the position in the YZ coordinate system, the sound emitted by the object 4B is output from the intersection P1 in a direction toward the head of the user 3A in the YZ coordinate system. This configuration can reduce a feeling of strangeness felt by the user 3A with respect to a direction from which the sound emitted by the object 4B is heard, as compared to a case in which a sound source that outputs the sound emitted by the object 4B is fixed.

Figure 7:
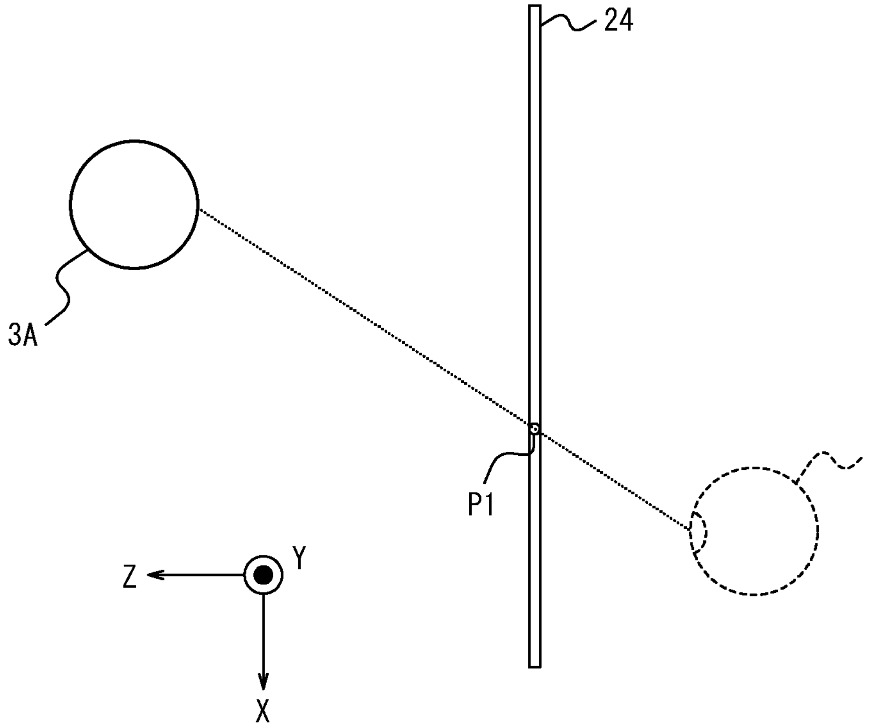
FIG. 7 is a drawing illustrating yet another example of the intersection at which the virtual sound source is formed.

FIG. 7 illustrates yet another example of the intersection at which the virtual sound source is to be formed. In FIG. 7, the position of the head of the object 4B disposed in the virtual space is illustrated with a dashed line in the real space.

In FIG. 7, the position of the intersection P1 at which the virtual sound source is to be formed is identified as a position in an XZ coordinate system. The XZ coordinate system is a two-dimensional coordinate system in the real space that includes the X direction, being the horizontal direction of the display 24, and the Z direction, being the facing direction in which the user 3A faces the display 24.

The controller 28 identifies, in the XZ coordinate system, the position of the intersection P1 between the screen of the display 24 and a straight line connecting the position of the mouth of the object 4B and the position of the head of the user 3A. The controller 28 forms the virtual sound source, which outputs the sound emitted by the object 4B, at the intersection P1.

By identifying the position of the intersection P1 as the position in the XZ coordinate system, the sound emitted by the object 4B is output from the intersection P1 in a direction toward the head of the user 3A in the XZ coordinate system. This configuration can reduce a feeling of strangeness felt by the user 3A with respect to a direction from which the sound emitted by the object 4B is heard, as compared to a case in which a sound source that outputs the sound emitted by the object 4B is fixed.

Here, in a case in which the processing of steps S31 to S37 described above is performed repeatedly, in the processing of step S34, the controller 28 may newly identify the position of the mouth of the object 4B when the object 4B moves. In this case, in the processing of step S35, the controller 28 may newly identify the position of the intersection P1 using the newly identified position of the mouth of the object 4B. In the processing of step S37, the controller 28 may form the virtual sound source, which outputs the sound emitted by the object 4B, at the newly identified intersection P1. This configuration can reduce a feeling of strangeness felt by the user 3A with respect to a direction from which the sound emitted by the object 4B is heard, even when the object 4B moves due to movement of the user 3B.

In a case in which the processing of steps S31 to S37 described above is performed repeatedly, in the processing of step S35, the controller 28 may newly identify the position of the head of the user 3A when the head of the user 3A moves. The controller 28 may newly identify the position of the intersection P1 using the newly identified position of the head of the user 3A. In this case, in the processing of step S37, the controller 28 may form the virtual sound source, which outputs the sound emitted by the object 4B, at the newly identified intersection P1. This configuration can reduce a feeling of strangeness felt by the user 3A with respect to a direction from which the sound emitted by the object 4B is heard, even when the head of the user 3A moves due to movement of the user 3A.

In addition, it is assumed in the above description that there is only one object. However, there may be a plurality of objects. For example, in a case in which there are three or more participants in the virtual event, the objects can be multiple. In a case in which the objects are multiple, the controller 28 may form a plurality of virtual sound sources that output sound emitted by the multiple objects, respectively, at intersections between the screen of the display 24 and each straight line connecting the position of a mouth of each of the objects in the real space and the position of the head of the user 3A. In this case, the number of multiple virtual sound sources can be the same as the number of the multiple objects. This configuration can reduce a feeling of strangeness felt by the user 3A with respect to a direction from which the sound emitted by each of the objects is heard, even when interlocutors are multiple.

In the above description, the controller 28 may form the virtual sound source, which outputs the sound emitted by the object 4B, at an intersection P1 between the screen of the display 24 and a straight line connecting the position of the mouth of the object 4B in the real space and the center position of a face of the head of the user 3A. When the face of the user 3A is directed to the screen of the display 24, the controller 28 may choose such a configuration. This configuration allows the sound emitted by the object 4B to be output from the virtual sound source formed at the intersection P1 in a direction toward the center of the face of the user 3A. The sound emitted by the object 4B is output in the direction toward the center of the face of the user 3A, so that the sound emitted by the object 4B is output equally to two ears of the user 3A. Equally outputting the sound emitted by the object 4B to the two ears of the user 3A can further reduce a feeling of strangeness felt by the user 3A.

In the above description, the controller 28 may form the virtual sound source, which outputs the sound emitted by the object 4B, at an intersection P1 between the screen of the display 24 and a straight line connecting the position of the mouth of the object 4B in the real space and the position of any one of two ears of the head of the user 3A. The controller 28 may select an ear that is closer to the screen of the display 24, of the two ears of the user 3A. The controller 28 may identify the position of the intersection P1 using the position of the selected ear. This configuration allows the sound emitted by the object 4B to be output from the virtual sound source formed at the intersection P1 in a direction toward the ear of the user 3A. Outputting the sound emitted by the object 4B in the direction toward the ear of the user 3A can further reduce a feeling of strangeness felt by the user 3A.

In the above description, the controller 28 may form the virtual sound source, which outputs the sound emitted by the object 4B, at each intersection P1 between the screen of the display 24 and a straight line connecting the position of the mouth of the object 4B in the real space and the position of each of two ears of the user 3A. In this case, two virtual sound sources corresponding to the left and right ears of the user 3A, respectively, are formed. This configuration allows the sound emitted by the object 4B to be output to both the ears of the user 3A, thus further reducing a feeling of strangeness felt by the user 3A.

Thus, in the terminal apparatuses 20 according to the present embodiment, for example, the controller 28 forms the virtual sound source, which outputs the sound emitted by the object 4B, at the intersection P1. This configuration can reduce a feeling of strangeness felt by the user 3A with respect to a direction from which the sound emitted by the object 4B, being an interlocutor, is heard, as compared to a case in which a sound source for outputting the sound emitted by the object 4B is fixed.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, in the embodiment described above, the controller 28 is described as identifying the position of the intersection P1 between the screen of the display 24 and the straight line connecting the position of the mouth of the object 4B in the real space and the position of the head of the user 3A facing the display 24. In other words, the controller 28 is described as identifying the position of the intersection P1 in a coordinate system in the real space. However, the controller 28 may identify the position of the intersection P1 in a coordinate system in the virtual space. In other words, the controller 28 may specify, in a coordinate system in the virtual space, the position of the intersection P1 between the screen of the display 24 and the straight line connecting the position of the mouth of object 4B and the position of the head of the user 3A facing the display 24.

For example, in the embodiment described above, the terminal apparatus 20A and the terminal apparatus 20B are described as performing the virtual event via the server apparatus 10. However, the terminal apparatus 20A and the terminal apparatus 20B may perform the virtual event without through the server apparatus 10. As an example, the terminal apparatus 20A and the terminal apparatus 20B may perform the virtual event while being connected in a Peer to Peer (P2P) architecture.

For example, an embodiment in which a general purpose computer functions as the terminal apparatuses 20 according to the above embodiment can also be implemented. Specifically, a program in which processes for realizing the functions of the terminal apparatuses 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. A terminal apparatus comprising:

a display; and a controller configured to form a virtual sound source outputting sound emitted by an object, at an intersection between a screen of the display and a straight line connecting a position, in real space, of a mouth of the object disposed in virtual space viewed from a virtual camera and a position, in the real space, of a head of a user of the terminal apparatus facing the display, wherein the controller is further configured to:

identify a position of the mouth of the object in a three-dimensional coordinate system in the real space from a position of the mouth of the object in the virtual space, by converting a coordinate system in the virtual space into the three-dimensional coordinate system in the real space;

identify a position of the head of the user in the three-dimensional coordinate system in the real space, based on a captured image of the user;

identify a position of the intersection in the three-dimensional coordinate system in the real space, based on the identified position of the mouth of the object in the three-dimensional coordinate system in the real space, the identified position of the head of the user in the three-dimensional coordinate system in the real space, and a position of each pixel of the screen of the display in the three-dimensional coordinate system in the real space; and form the virtual sound source at the identified position of the intersection in the three-dimensional coordinate system in the real space.

2. The terminal apparatus according to claim 1, wherein in identifying a position of the intersection at which the virtual sound source is to be formed, using an identified position of the head of the user, the controller newly identifies a position of the head of the user when the head of the user moves, and the controller newly identifies a position of the intersection using the newly identified position of the head of the user.

3. The terminal apparatus according to claim 1, wherein in identifying a position of the intersection at which the virtual sound source is to be formed, using an identified position of the mouth of the object, the controller newly identifies a position of the mouth of the object when the object moves, and the controller newly identifies a position of the intersection using the newly identified position of the mouth of the object.

4. The terminal apparatus according to claim 1, wherein the controller is configured to form the virtual sound source at an intersection between the screen of the display and a straight line connecting the position of the mouth of the object in the real space and a center position of a face of the head of the user.

5. The terminal apparatus according to claim 1, wherein the controller is configured to form the virtual sound source at an intersection between the screen of the display and a straight line connecting the position of the mouth of the object in the real space and a position of any one of two ears of the head of the user.

6. The terminal apparatus according to claim 1, wherein the controller is configured to form the virtual sound source at each of intersections of the screen of the display and straight lines connecting the position of the mouth of the object in the real space and a position of each of two ears of the head of the user.

7. The terminal apparatus according to claim 1, wherein the controller is configured to form the virtual sound source at an intersection, in a two-dimensional coordinate system in the real space, between the screen of the display and the straight line connecting the position of the mouth of the object and the position of the head of the user.

8. The terminal apparatus according to claim 7, wherein the two-dimensional coordinate system in the real space is a coordinate system including a vertical direction of the display and a facing direction in which the user faces the display.

9. The terminal apparatus according to claim 7, wherein the two-dimensional coordinate system in the real space is a coordinate system including a horizontal direction of the display and a facing direction in which the user faces the display.

10. The terminal apparatus according to claim 1, wherein the controller is configured to form a plurality of virtual sound sources outputting sound emitted by a plurality of objects, respectively, at intersections between the screen of the display and each straight line connecting a position of a mouth of each of the plurality of objects in the real space and the position of the head of the user.

11. An operating method of a terminal apparatus comprising forming a virtual sound source outputting sound emitted by an object, at an intersection between a screen of a display and a straight line connecting a position, in real space, of a mouth of the object disposed in virtual space viewed from a virtual camera and a position, in the real space, of a head of a user of the terminal apparatus facing the display, wherein the method further comprises:

identifying a position of the mouth of the object in a three-dimensional coordinate system in the real space from a position of the mouth of the object in the virtual space, by converting a coordinate system in the virtual space into the three-dimensional coordinate system in the real space;

identifying a position of the head of the user in the three-dimensional coordinate system in the real space, based on a captured image of the user;

identifying a position of the intersection in the three-dimensional coordinate system in the real space, based on the identified position of the mouth of the object in the three-dimensional coordinate system in the real space, the identified position of the head of the user in the three-dimensional coordinate system in the real space, and a position of each pixel of the screen of the display in the three-dimensional coordinate system in the real space; and forming the virtual sound source at the identified position of the intersection in the three-dimensional coordinate system in the real space.

12. A non-transitory computer readable medium storing a program configured to cause a computer to execute operations, the operations comprising forming a virtual sound source outputting sound emitted by an object, at an intersection between a screen of a display and a straight line connecting a position, in real space, of a mouth of the object disposed in virtual space viewed from a virtual camera and a position, in the real space, of a head of a user of the terminal apparatus facing the display, wherein the operations further comprises:

identifying a position of the mouth of the object in a three-dimensional coordinate system in the real space from a position of the mouth of the object in the virtual space, by converting a coordinate system in the virtual space into the three-dimensional coordinate system in the real space;

identifying a position of the head of the user in the three-dimensional coordinate system in the real space, based on a captured image of the user;

identifying a position of the intersection in the three-dimensional coordinate system in the real space, based on the identified position of the mouth of the object in the three-dimensional coordinate system in the real space, the identified position of the head of the user in the three-dimensional coordinate system in the real space, and a position of each pixel of the screen of the display in the three-dimensional coordinate system in the real space; and forming the virtual sound source at the identified position of the intersection in the three-dimensional coordinate system in the real space.

* * * * *